United States Patent Office 3,366,141
Patented Jan. 30, 1968

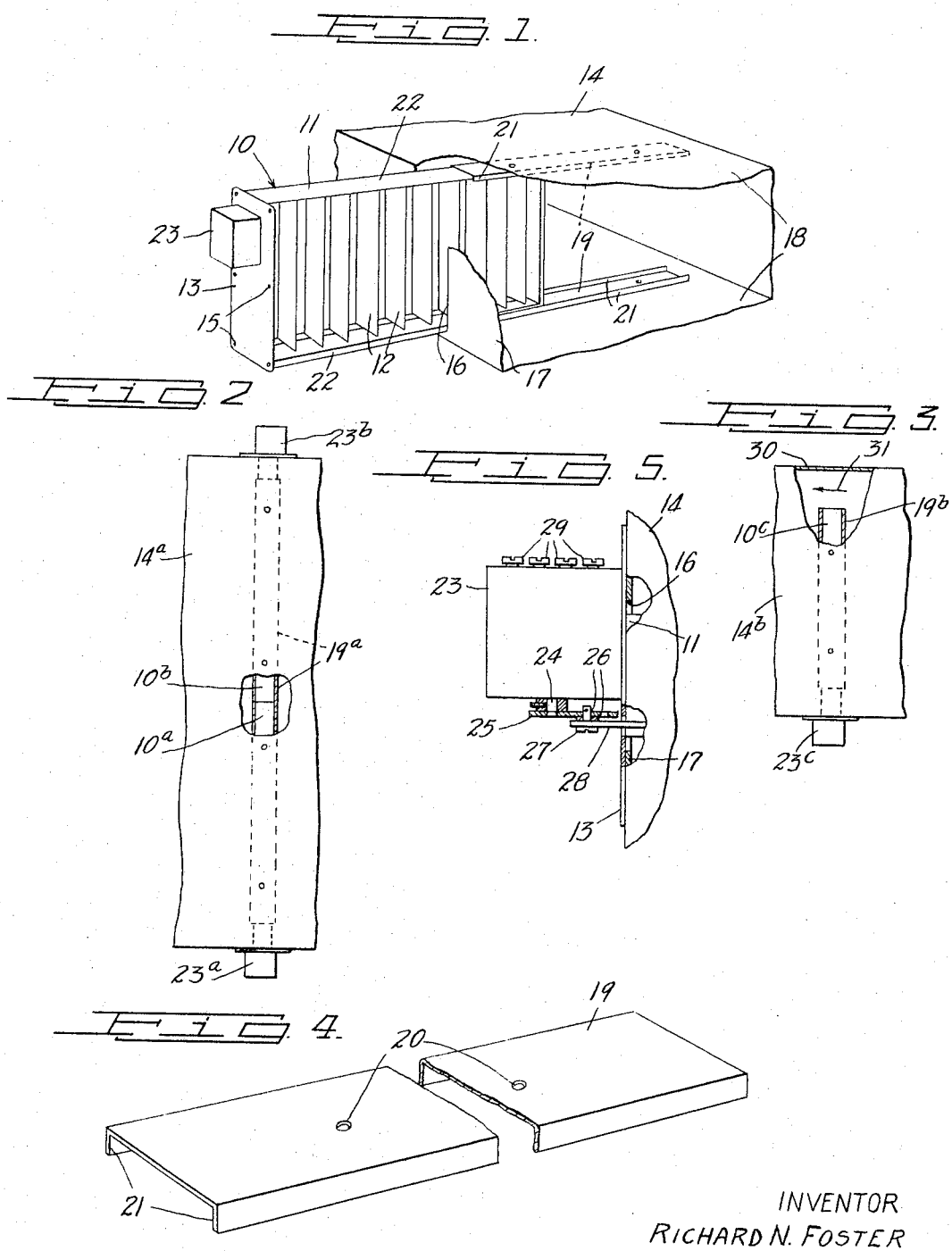

3,366,141
SUPPORT FOR ZONE CONTROL DAMPERS
Richard N. Foster, 160 Rock Hill Road,
Clifton, N.J. 07013
Filed Jan. 26, 1966, Ser. No. 523,181
5 Claims. (Cl. 137—625.31)

ABSTRACT OF THE DISCLOSURE

In heating and cooling systems employing air ducts directed to various zone areas, a means for detachably supporting an air valve damper in a duct leading to an area, wherein said means reinforces the support of the damper in the duct, as well as facilitating attachment and detachment of the damper, the said support means being on opposed walls of the duct and at right angles to the wall of the duct apertured for mounting and insertion and removal of the damper.

---

This invention relates to zone control dampers generally of the type and kind disclosed in my application Ser. No. 410,555, filed Nov. 12, 1964, issued in Letters Patent 3,282,504 Nov. 1, 1966. More particularly, my invention deals with the provision of means for supporting and reinforcing the mounting of an air valve damper in the duct in which the air valve damper is supported in positively retaining the air valve damper assemblage against shifting movement in the duct. Still more particularly, the invention deals with support means for receiving two alined dampers, as well as support of dampers in such manner as to transverse only a predetermined cross-sectional area of a duct in providing a predetermined positive flow of air through the duct in combination with the control governed by the air valve damper.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic perspective view schematically outlining a broken away portion of a duct and illustrating my improved supports therein, with the air valve damper shown in a partially assembled position, the structural details of the damper being omitted for sake of simplicity in the showing.

FIG. 2 is a diagrammatic plan view showing a dual air valve damper arrangement supported in a wide duct, part of the construction being broken away and in section.

FIG. 3 is a view, generally similar to FIG. 2, illustrating the support of an air valve damper in a duct wherein the damper maintains in the duct a predetermined free passage of air beyond the control of the damper.

FIG. 4 is an enlarged perspective view of one of the supports which I employ, with part of the construction broken away; and FIG. 5 is an enlarged plan view of a side portion of a damper illustrating, in part, the means for actuating the louvers of the air valve damper, parts of the construction being broken away and in section.

Considering FIG. 1 of the drawing, I have shown at 10, in a schematic manner, an air valve damper, generally of the type and kind disclosed in the application heretofore identified, the damper comprising an oblong rectangular casing 11, in which are supported a plurality of pivoted louvers 12, the casing including, at its outer end, a mounting plate 13 for attachment of the damper 10 to a side wall of a duct 14 by suitable fastening devices passed through apertures 15 in the plate 13.

In effecting an assemblage of the damper 10 with the duct 14, an aperture 16 is formed in a side wall 17 of the duct, as diagrammatically shown, for insertion of and removal of the damper.

Supported on inner surfaces of the top and bottom walls 18 of the duct in vertical alinement are two channel supporting plates or members 19 riveted or otherwise secured to the walls 18 by fasteners passed through suitably spaced apertures 20. The side flanges 21 of the members 19 project into the chamber of the duct and snugly engage side portions of the top and bottom members 22 of the casing 11. Considering FIG. 1 of the drawing, it will be apparent that the members 19 terminate short of side walls of the duct 14, but extend the major portion of the transverse dimensions of the duct. The members 19, in addition to providing a guide for the insertion and removal of the damper 10, also reinforce attachment of the damper 10 to the duct and to resist stresses or strains, to which the damper supported in the duct may be subjected by the flow of air through the duct.

Installations of the type and kind under consideration are utilized in hot and cold air supplies for servicing rooms of a home, building or the like.

Supported upon the outer surface of the plate 13 is an actuator 23, which is just schematically outlined in FIG. 1 and shown in somewhat more detail in FIG. 5 of the drawing. Here again, reference is made to the application hereinfore referred to and, in FIG. 5, 24 represents the shaft of the motor of said actuator which projects at one side of the casing of the actuator and fixed to the end of the shaft is a crank 25, having two or more apertures 26 for the reception of a pin 27 coupled with a louver operating link 28. At 29 I have shown part of the electrical terminals, with which the circuit wires controlling operation of the actuator are coupled.

Considering FIG. 2 of the drawing, at 14a I have shown a somewhat wider duct for supporting two air valve dampers 10a, 10b, generally similar to the damper 10, and at 19a are shown longer reinforcing plates or members, again generally similar in construction to the member 19 and supported on upper and lower walls of the duct 14a, in the manner diagrammatically illustrated in FIG. 1 of the drawing. With a structure of this type and kind, a control can be provided, wherein one damper only, for example, the damper 10a, can be actuated, while the other damper 10b is maintained closed, the dampers in this showing collectively transversing the entire duct 14a. In other instances and for better distribution of the flow of air, both dampers may be partially or fully opened by operation of the independent actuators constituting part of the dampers 10a, 10b, the actuators being diagrammatically shown at 23a and 23b.

Turning now to the showing in FIG. 3 of the drawing, in this FIGURE, 14b represents the duct which could be generally of the size of the duct shown in FIG. 1 and at 10c is shown an air valve damper, shorter than the damper 10, so that its inner end terminates short of the side wall 30 of the duct 14b to provide, at all times, a clear unobstructed passage of air through the duct 14b, as indicated diagrammatically by the arrow 31. In this figure, 19b represents the channel plate or member, similar to the member 19 for reinforcing the support of the damper 10c in the duct 10b. At 23c is shown the actuator for the damper 10c. With certain installations, it has been found desirable to at all times provide a free passage of air through the duct and the degree of this free passage will be governed by the extension of the damper 10c transversely across the duct.

From the foregoing, it will be apparent that the air valve dampers are prefabricated units which can be readily installed in ducts which have been originally installed in a home or building. All that is necessary is to form the aperture, as at 16, in a wall of the duct and, then, attach the channel plates or members to other opposed walls of the duct for guidance and reinforcement of the air valve damper assemblage. It will, thus, be apparent that the cost of installing air valve dampers of the kind under consideration is materially minimized. Air valve dampers can be installed in ducts that are arranged horizontally as well as vertically in a building and one of the dampers can control an entire zone of a building, with a single thermostat control for the zone. This is particularly desirable where different hot and cold temperatures are desired in the various zones of a complete home and/or rooms of an office or other building. It will also be apparent that, with my improved construction, the entire air valve damper assemblage can be attached and detached when desired for cleaning or other purposes.

Having fully described my invention, what I claim as new and desire to secure by Letters Patent is:

1. In heating and cooling systems employing air ducts extending to independent zone areas, with air valve dampers mounted in ducts leading to such areas, each of said dampers including a louver casing mounted in an aperture in a wall of the duct and extending transversely of said duct, and means on opposed walls of each duct at right angles to said apertured wall engaging the casing of the damper mounted in the duct for guidance and reinforcement of the damper in its support in conjunction with the duct.

2. In a system as defined in claim 1, wherein said means comprises channel members secured to said opposed walls of the duct, with the channels of said members directed inwardly, said channel members being in alinement with the aperture, and said aperture facilitating insertion and removal of a damper with respect to the duct.

3. In a system as defined in claim 1, wherein the casing of the damper terminates short of the opposed wall of the duct in maintaining in the duct a passage uncontrolled by said damper.

4. In a system as defined in claim 1, wherein a pair of dampers are arranged in common alinement transversely of the duct, said dampers being supported and reinforced by said means, and each damper having an independent control for actuating the louvers in the casing of each damper.

5. In a system as defined in claim 1, wherein the casing of the damper includes at one end a mounting plate arranged on the outer surface of said first named wall of the duct, and an actuator supported on the outer surface of said mounting plate controlling operation of the louvers of said damper.

References Cited

UNITED STATES PATENTS

| | | | |
|---|---|---|---|
| 998,994 | 7/1911 | Smith | 251—329 X |
| 2,397,672 | 4/1946 | Leigh | 98—41 X |

M. CARY NELSON, *Primary Examiner.*

ARNOLD ROSENTHAL, *Examiner.*